United States Patent [19]

Shalati et al.

[11] Patent Number: 5,086,144
[45] Date of Patent: Feb. 4, 1992

[54] ACID-FUNCTIONAL POLYMERS DERIVED FROM CELLULOSE ACETATE BUTYRATE UNSATURATED ALCOHOL COPOLYMERS AND COATINGS PREPARED FROM SAME

[75] Inventors: Mohamad D. Shalati, Richton Park; James A. Marquart, Chicago Heights; John R. Babjak, Tinley Park; Rodney M. Harris, Chicago, all of Ill.

[73] Assignee: The Sherwin-Williams Company, Cleveland, Ohio

[21] Appl. No.: 393,194

[22] Filed: Aug. 14, 1989

Related U.S. Application Data

[62] Division of Ser. No. 121,265, Nov. 16, 1987, Pat. No. 4,859,758.

[51] Int. Cl.$^5$ .............................................. C08F 251/02
[52] U.S. Cl. .................................. 527/313; 527/314; 527/315; 428/413; 428/414
[58] Field of Search ................. 527/313, 314, 315; 428/413, 414

[56] References Cited

U.S. PATENT DOCUMENTS 4,859,758  8/1989  Shalati et al. ...................... 527/313

Primary Examiner—John Kight, III
Assistant Examiner—Frederick Krass
Attorney, Agent, or Firm—Robert E. McDonald

[57] ABSTRACT

Novel carboxylic acid-functional polymers are obtained by reacting:
(a) a hydroxy-functional polymer having an average of at least two hydroxyl groups per molecule; and
(b) a cyclic anhydride under reaction conditions to produce acid groups and ester groups; and wherein the hydroxy-functional polymer is obtained by the copolymerization of:
(i) 1-95 weight percent of a cellulose ester; and
(ii) 5-99 weight percent of at least one ethylenically unsaturated alcohol copolymerizable with the cellulose acetate butyrate; and
(iii) 0-94 weight percent of at least one other ethylenically unsaturated monomer copolymerizable with the cellulose ester and the ethylenically unsaturated alcohol.

Curable compositions especially useful as coatings are prepared by mixing the novel carboxylic acid-functional polymers with epoxy-functional compounds and, optionally, with anhydridefunctional compounds and, optionally, hydroxy-functional compounds. The coatings are especially useful in clearcoat/basecoat compositions.

44 Claims, No Drawings

ACID-FUNCTIONAL POLYMERS DERIVED FROM CELLULOSE ACETATE BUTYRATE UNSATURATED ALCOHOL COPOLYMERS AND COATINGS PREPARED FROM SAME

This is a divisional of copending application Ser. No. 07/121,265 filed on Nov. 16, 1987, now U.S. Pat. No. 4,859,758.

BACKGROUND OF THE INVENTION

1. Field of the Invention

This invention relates to novel acid-functional polymers obtained by reacting a hydroxy-functional cellulose ester copolymer with a cyclic dicarboxylic anhydride to produce acid groups and ester groups. The hydroxy-functional cellulose ester copolymer comprises the graft copolymer reaction product obtained by polymerizing an ethylenically unsaturated alcohol, and optionally, at least one other copolymerizable ethylenically unsaturated monomer in the presence of a cellulose ester, e.g. cellulose acetate butyrate (CAB) polymer.

This invention also relates to novel reactive coatings which utilize the acid-functional polymers. The coatings can be cured at room temperature or force dried at temperatures ranging up to about 350° F. The coatings may be utilized as primers, topcoats or as clearcoats and/or basecoats in clearcoat/basecoat compositions. The coatings involve the combination of the carboxylic acid-functional cellulose ester based polymers with an epoxy-functional compound. The coatings may, optionally, also include an anhydride-functional compound and, optionally, also hydroxy-functional compound. These combinations provide fast reacting, durable coatings which minimize the toxicity problems which may be associated with other low temperature curing systems.

2. Description of the Prior Art

Graft copolymers obtained by the free radical addition polymerization of cellulosic materials and ethylenically unsaturated monomers to produce hydroxy-functional polymers has been known in the art. U.S. Pat. No. 3,883,453 teaches coating compositions containing a copolymer of mixed alkyl esters of acrylic or methacrylic acid polymerized in the presence of cellulose acetate butyrate and teaches that this hydroxy-functional polymer can subsequently be cross-linked with an amino resin. U.S. Pat. No. 4,358,510 teaches metallic paint films utilizing as a vehicle component a modified vinyl-type graft copolymer obtained by graft copolymerizing cellulose acetate butyrate with one or more vinyl-type unsaturated monomers. Although these prior art hydroxy-functional vehicles have utility when combined with curing agents reactive with the hydroxyl groups, they do not teach low temperature curing reactive systems having minimal toxicity. The acid-functional vehicles of this invention provide unique reactivity, solvency and performance improvements over the hydroxy-functional cellulose ester based graft copolymer vehicles of the prior art.

One common prior art approach to high performance low temperature curing coatings has involved two-component coatings comprising reactive isocyanates and active hydrogen-containing compounds such as hydroxyl-containing polymers or amine-containing polymers to produce polyurethane or polyurea coatings. Although these materials have excellent performance and cure at low temperatures, the isocyanates may, under some conditions, be relatively hazardous to handle.

Coating compositions comprising reactive combinations of epoxy-containing compounds and compounds having acid or amine functionality are known in the art. Similarly, coating compositions comprising cyclic anhydrides and hydroxy-functional compounds are also known in the art. The prior art has not, however, taught the novel acid-functional polymers of this invention nor has it taught coating compositions comprising these acid-functional polymers with epoxy-functional compounds and, optionally, anhydride-functional compounds, and, optionally, hydroxy-functional compounds to provide low temperature curing coatings having excellent durability and performance.

BRIEF SUMMARY OF THE INVENTION

This invention involves an acid-functional polymer having an average of at least two carboxylic acid groups per molecule which comprises the reaction product obtained by reacting
(a) a hydroxy-functional polymer having an average of at least two hydroxyl groups per molecule; and
(b) a cyclic dicarboxylic anhydride;
under reaction conditions to produce acid groups and ester groups; wherein the hydroxy-functional polymer is a copolymer obtained by the polymerization of:
  (i) 1–95 weight percent preferably 1–35 weight percent, of a cellulose ester; and
  (ii) 5–99 weight percent of at least one ethylenically unsaturated alcohol copolymerizable with the cellulose ester; and
  (iii) 0–94 weight percent of at least one other ethylenically unsaturated monomer copolymerizable with the cellulose ester and the ethylenically unsaturated alcohol.

A more specific preferred copolymer formulation comprises the copolymer obtained by the copolymerization of:
  (i) 1–35 weight percent of a cellulose ester; and
  (ii) 5–35 weight percent of at least one ethylenically unsaturated alcohol copolymerizable with the cellulose ester; and
  (iii) 1–50 weight percent styrene; and
  (iv) 0–Σweight percent of at least one other ethylenically unsaturated monomer copolymerizable with the cellulose ester and the ethylenically unsaturated alcohol.

This invention also relates to curable coating compositions comprising the acid-functional polymer and an epoxy-functional compound, optionally also in combination with other reactive materials such as an anhydride-functional compound. If desired, in addition to the anhydride-functional compound, hydroxy-functional compounds reactive with the anhydrides can be added as well. The term "compound" is used in its broadest sense to include monomers, oligomers and polymers. This invention also relates to substrates coated with the coating compositions of this invention.

In the most preferred coating formulations the epoxy-functional compound is an epoxy compound having an average of at least two epoxy groups, especially cycloaliphatic epoxy groups, per molecule.

It is especially preferred to utilize the curable coating compositions of this invention in combination with about 5 to about 80% by weight of the total coating composition of an inert solvent. It is convenient to provide the coating composition as a multicomponent system which is reactive upon mixing the components. Especially preferred is a two-component system wherein the acid-functional polymer, and, if utilized, the anhydride-functional compound are combined in one package and the epoxy-functional compound and, if utilized, the hydroxy-functional compound provide a second package. The two packages can then be mixed together to provide the curable coatings immediately prior to application.

In one preferred application, this invention relates to coated substrates having a multi-layer decorative and/or protective coating which comprises:
(a) a basecoat comprising a pigmented film-forming polymer; and
(b) a transparent clearcoat comprising a film-forming polymer applied to the surface of the basecoat composition;
wherein the clearcoat and/or the basecoat comprises the curable coating compositions of this invention.

Accordingly, it is an object of this invention to provide novel acid-functional polymers. Another object is to provide improved curable compositions having excellent reactivity at low temperatures. It is a further object of this invention to provide coating compositions which may be utilized as primers, topcoats or clearcoats and/or basecoats in clearcoat/basecoat compositions. Another object of this invention is to provide an improved coating composition comprising the acid-functional cellulose ester based copolymer and an epoxy-functional compound and, optionally, an anhydride-functional compound, and, optionally, a hydroxy-functional compound. Another object of this invention is to provide coatings having excellent exterior durability and corrosion resistance. A further object of this invention is to provide improved coating compositions which can be cured at room temperature or force dried at elevated temperatures. These and other objects of the invention will become apparent from the following discussions.

DETAILED DESCRIPTION OF THE INVENTION

1. CELLULOSE ESTER BASED CARBOXYLIC ACID-FUNCTIONAL POLYMERS

The cellulose esters useful in this invention are well known materials. Cellulose esters are typically prepared by reactions of acids or, more commonly, anhydrides with the hydroxyl groups along the cellulose polymer chain. The average number of hydroxyl groups per 4 anhydroglucose repeating units along the cellulose chain that are not esterified generally varies from 0 to about 3. Preferred are those cellulose esters having an average of 0 to about 2.5 un-esterified hydroxyl groups, and most preferred is the range of 0 to about 2. The size and type of the alkyl or aryl groups of the ester substitution may vary widely depending upon the amount of substitution, and the overall composition of the resin. There is no known limit to the size and type of the ester substitution, although the acids and anhydrides commonly utilized to react with the hydroxyl groups to form the ester groups typically contain an average of about 2 to about 12 carbon atoms. Typical acids and anhydrides useful in the preparation of cellulose esters include formic, acetic, propionic, butyric, hexanoic, decanoic, stearic, and the like. These aliphatic esters may be branched or unbranched. Typical of suitable aromatic acids and anhydrides which are useful for reaction with the hydroxyl groups are benzoic acid and phthalic anhydride. Representative examples of suitable cellulose esters include cellulose acetate, cellulose propionate, cellulose butyrate, cellulose acetate propionate, cellulose acetate butyrate, cellulose acetate phthalate, etc. Especially preferred due to its cost and availability is cellulose acetate butyrate.

The cellulose acetate butyrate (CAB) which can be utilized in the preparation of the acid-functional polymer of this invention is a cellulose derivative which can be conveniently prepared by reacting cellulose with acetic and butyric acid or anhydride in the presence of an acid catalyst, such as sulfuric acid. Frequently, glacial acetic acid is utilized as the solvent.

The ratio of acetate and butyrate components may be varied over a wide range. The CAB materials preferably used in this invention are those wherein the range of degree of acetylization is typically 1–40 weight percent, preferably 1–20 weight percent, more preferably 1–10 percent; the butyl groups are in the range of 15–60 weight percent, preferably 30–60 percent and more preferably 40–60 percent. Typically, the remaining amount of hydroxyl groups will range from 0–10 weight percent.

CAB is commercially available and especially preferred in the practice of this invention are those products of Eastman Chemical Company sold under its "CAB" trade name, such as CAB-171-2, CAB-381-2, CAB-531-1, CAB-551-0.2 and CAB-551-0.01. The numbering designation indicates by the first two figures the approximate weight percent content of butyl groups. The third figure indicates the approximate content of the hydroxyl groups and the last figures following the hyphen indicates the viscosity in seconds of the CAB product.

It is also useful in the practice of this invention to utilize carboxylated cellulose esters such as carboxylated cellulose acetate, carboxylated cellulose acetate propionate, carboxylated cellulose acetate butyrate, etc. as the cellulose ester. The carboxylated cellulose esters are typically manufactured by reacting ordinary cellulose esters with ozone. The preparation of the carboxylated cellulose esters is taught in U.S. Pat. No. 4,590,265, issued May 20, 1986, the teaching of which is hereby incorporated by reference in its entirety.

Typically, in the manufacture of carboxylated cellulose esters, the cellulose ester starting material is provided to a reaction zone in a form which is suitable for reaction with ozone. For example, it is possible to provide the cellulose ester in the form of a solution in an appropriate solvent (i.e., one in which both the cellulose ester starting material and the carboxylated cellulose ester product are soluble), as an aqueous slurry, or, preferably, in a solid particulate form. Frequently the cellulose ester would be provided in the form of a powder. In the reaction zone, the cellulose ester is intimately contacted with a gaseous stream comprising ozone. Most preferably, the gaseous stream containing ozone is passed through a distributor plate and through a cellulose ester powder so as to create a fluidized solid. The gaseous stream preferably comprises at least about 0.25 weight percent ozone, based upon the total weight of gas present in the reaction system. The reaction is typically conducted at a temperature of about 25° to 80° C. (preferably about 50° to 75° C.). The cellulose ester is reacted with the ozone for a period of time sufficient to yield a carboxylated cellulose ester product. Typically, desirable carboxylated cellulose ester products have an acid number of at least about 5. Preferably, the acid number of the carboxylated cellulose esters is about 8 to about 40 and preferably about 10 to about 24. Selected carboxylated cellulose esters are commercially available from Eastman Chemical Company under its "XAB" trade name.

The copolymerization of the cellulose ester with the ethylenically unsaturated copolymerizable alcohol and, optionally, other copolymerizable monomers is typically carried out by solution polymerization in an inert solvent in the presence of a free-radical addition polymerization initiator. Typically, a solvent solution of the cellulose ester, e.g. CAB, will be prepared and heated to a reaction temperature, typically in the range of about 50°–180° C. and preferably between about 100° to about 160° C., and a mixture of the monomers and free-radical initiators, capable of hydrogen abstraction from the cellulose ester backbone, will be added slowly to the cellulose ester solution. Although it is not our intent to be bound by theory, analytical evidence has indicated that the cellulose ester and the unsaturated monomers are copolymerized under these reaction conditions to produce a graft copolymer.

Representative hydroxy-functional unsaturated monomers copolymerizable with the cellulose ester include the unsaturated alcohol esters such as those prepared by reacting unsaturated acids such as acrylic or methacrylic acids with diols. Representative hydroxy-functional monomers include 2-hydroxyethyl acrylate, 2-hydroxyethyl methacrylate, 2-hydroxypropyl acrylate, 4-hydroxybutyl methacrylate, 2-hydroxypropyl methacrylate, 3-hydroxybutyl acrylate, 4-hydroxypentyl acrylate, 2-hydroxyethyl ethacrylate, 3-hydroxybutyl methacrylate, 2-hydroxyethyl chloroacrylate, diethylene glycol methacrylate, tetraethylene glycol acrylate, para-vinyl benzyl alcohol, Tone® M-100 (an adduct of two moles of caprolactone and one mole of 2-hydroxyethyl acrylate available from Union Carbide), etc.

Typical monomers which can be copolymerized with the cellulose ester and the unsaturated alcohol include:

(a) esters of acrylic, methacrylic, crotonic, tiglic, or other unsaturated acids such as: methyl acrylate, ethyl acrylate, propyl acrylate, isopropyl acrylate, butyl acrylate, isobutyl acrylate, lauryl acrylate, ethylhexyl acrylate, amyl acrylate, 3,5,5-trimethylhexyl acrylate, lauryl methacrylate, methyl methacrylate, ethyl methacrylate, propyl methacrylate, dimethylaminoethyl methacrylate, isobornyl methacrylate, ethyl tiglate, methyl crotonate, ethyl crotonate, etc.;

(b) vinyl compounds such as vinyl acetate, vinyl propionate, vinyl butyrate, vinyl isobutyrate, vinyl benzoate, vinyl m-chlorobenzoate, vinyl p-methoxybenzoate, vinyl alpha-chloroacetate, vinyl toluene, vinyl chloride, etc.;

(c) styrene-based materials such as styrene, alpha-methyl styrene, alpha-ethyl styrene, alpha-bromo styrene, 2,6-dichlorostyrene, etc.;

(d) allyl compounds such as allyl chloride, allyl acetate, allyl benzoate, allyl methacrylate, etc.;

(e) other copolymerizable unsaturated monomers such as ethylene, acrylonitrile, methacrylonitrile, dimethyl maleate, isopropenyl acetate, isopropenyl isobutyrate, acrylamide, methacrylamide, and dienes such as 1,3-butadiene, etc.;

(f) unsaturated acids, such as acrylic acid, methacrylic acid, crotonic acid, tiglic acid, etc.

Typically the monomers and the cellulose ester will be reacted in the presence of a conventional initiator known in the art to generate a free radical such as azobis(isobutyronitrile), cumene hydroperoxide, t-butyl perbenzoate, t-butyl peroctoate, amyl peroctoate, etc. The molecular weight of the polymer can be controlled, if desired, by the monomer selection, reaction temperature and time, and/or the use of chain transfer agents as is well known in the art.

The carboxylic acid-functional copolymers which are useful in the practice of this invention should have an average of at least two carboxylic acid groups per molecule. The acid-functional polymers can be conveniently prepared by reacting the hydroxy-functional polymer (which was prepared by the polymerization of the cellulose ester, the ethylenically unsaturated alcohol and, optionally, other copolymerizable monomers) with an amount of a cyclic carboxylic anhydride sufficient to provide the desired final acid value. The reaction of the anhydride with the hydroxyl groups of the hydroxy-functional copolymer is conducted under reaction conditions to open the anhydride ring and produce ester groups and acid groups. The possible subsequent reaction of the carboxylic acid formed during this reaction with any remaining hydroxyl groups is minimized as much as possible by conducting the reaction under relatively mild conditions.

The cyclic carboxylic acid anhydrides useful in the practice of this invention to produce the carboxylic acid-functional half-ester product by reaction with the hydroxy-functional polymer can be any monomeric aliphatic or aromatic cyclic anhydride having one anhydride group per molecule. Representative anhydrides include, phthalic anhydride, 3-nitrophthalic anhydride, 4-nitrophthalic anhydride, 3-fluorophthalic anhydride, 4-chlorophthalic anhydride, tetrachlorophthalic anhydride, tetrabromophthalic anhydride, tetrahydrophthalic anhydride, hexahydrophthalic anhydride, methylhexahydrophthalic anhydride, succinic anhydride, dodecenylsuccinic anhydride, octylsuccinic anhydride, maleic anhydride, dichloromaleic anhydride, glutaric anhydride, adipic anhydride, chlorendic anhydric, itaconic anhydride, citraconic anhydride, endomethylenetetrahydrophthalic anhydride, cyclohexane-1,2-dicarboxylic anhydride, 4-cyclohexene-1,2-dicarboxylic anhydride, 4-methyl-4-cyclohexene-1,2-dicarboxylic anhydride, 5-norbornene-2,3-dicarboxylic anhydride, 1,4-cyclohexadiene-1,2-dicarboxylic anhydride, 1,3-cyclopentanedicarboxylic anhydride, diglycolic acid anhydride, etc. Maleic anhydride is especially preferred because of its reactivity and relatively low cost. Other useful anhydrides include those anhydrides having a free carboxyl group in addition to the anhydride group such as trimellitic anhydride, aconitic anhydride, 2,6,7-naphthalene tricarboxylic anhydride, 1,2,4-butane tricarboxylic anhydride, 1,3,4-cyclopentane tricarboxylic anhydride, etc.

The reaction of the hydroxy-functional copolymer and the cyclic anhydride should normally be conducted at temperatures less than about 75° C., preferably less than 60° C., and most preferably between about 35° C. to 60° C. The reaction temperature is maintained until the reaction has proceeded to provide the desired amount of half-ester groups on the acid-functional polymer. Normally, as a convenient measure of the extent of the reaction, the reaction will be continued until no change in the amount of residual unreacted anhydride can be observed, and will generally involve reacting at least about 70%, and preferably at least 95%, of the available anhydride. The extent of the anhydride reaction can be measured by IR spectroscopy. If the subsequent end use of the acid-functional polymer can tolerate the remaining free anhydride, if any, no separation or removal of the excess unreacted anhydride is necessary. If the end use of the acid-functional polymer requires that it be free of any unreacted anhydride, the reaction can be continued until substantially all of the anhydride has reacted, or the free anhydride may be removed by vacuum distillation or other techniques well known in the art.

The level of anhydride reacted with the hydroxy-functional polymer need only be sufficient to provide the final desired acid value of the acid-functional compound. Typically the reaction would be conducted by admixing the hydroxy-functional polymer and the anhydride at levels to provide at least about 0.3 and normally about 0.7 to 1.0 anhydride groups for each hydroxyl group. By conducting the reaction at temperatures less than about 75° C. the carboxylic acid groups formed as part of the half-ester are not appreciably reactive with the hydroxyl groups themselves and so they do not compete with the ring opening half-ester reaction of the remaining anhydrides.

In order to conduct the reaction at these relatively low temperatures, it is preferred to utilize an esterification catalyst. The catalyst should be present in sufficient amount to catalyze the reaction and typically will be present at a level of at least about 0.1%, and normally from about 0.05% to about 3.0%, based upon the weight of the cyclic anhydride. Catalysts which are useful in the esterification reaction of the anhydride with the hydroxy-functional polymer include mineral acids such as hydrochloric acid and sulfuric acid; alkali metal hydroxides such as sodium hydroxide; tin compounds such as stannous octoate, or dibutyltin oxide; aliphatic or aromatic amines, especially tertiary alkyl amines, such as triethylamine; and aromatic heterocyclic amines such as N-methyl imidazole and the like. Especially preferred are N-methyl imidazole and triethylamine.

Although the reaction between the hydroxy-functional copolymer and the anhydride can be conducted in the absence of solvent if the materials are liquid at the reaction temperature, it is normally preferred to conduct the reaction in the presence of an inert solvent such as esters, ketones, ethers or aromatic hydrocarbons. If desired, the acid-functional polymer can be utilized as the solvent solution, or, optionally, all or part of the inert solvent may be removed, e.g. by distillation, after the reaction is completed.

After the reaction is completed, it is frequently desirable to add a low molecular weight alcohol solvent, such as isobutanol or isopropanol, to the acid functional polymer at a level of about 5 to 35% by weight to provide improved stability or storage.

2. REACTIVE COATING COMPOSITIONS

The novel acid-functional polymers of this invention can be combined with other compounds which are reactive with the acid functionality to produce reactive coating compositions. These reactive coating compositions could comprise:

(i) the acid-functional polymer and a polyepoxide;

(ii) the acid-functional polymer, a polyanhydride and a monoepoxide or polyepoxide; or (iii) the acid-functional polymer, a polyanhydride, a mono- or polyepoxide and a hydroxy-functional compound.

2.A. EPOXY-FUNCTIONAL COMPOUNDS

The coatings of this invention also require the use of at least one epoxy-functional compound. The epoxy compound, preferably, will be a polyepoxide having an average of at least two epoxy groups per molecule. If the acid-functional polymer of this invention is used in combination with an anhydride-functional compound and, optionally a hydroxy-functional compound, then either a monoepoxide or a polyepoxide can be used.

Representative useful monoepoxides include the monoglycidyl ethers of aliphatic or aromatic alcohols such as butyl glycidyl ether, octyl glycidyl ether, nonyl glycidyl ether, decyl glycidyl ether, dodecyl glycidyl ether, p-tert-butylphenyl glycidyl ether, and o-cresyl glycidyl ether. Monoepoxy esters such as the glycidyl ester of versatic acid (commercially available as CARDURA® E from Shell Chemical Company), or the glycidyl esters of other acids such as tertiary-nonanoic acid, tertiary-decanoic acid, tertiary-undecanoic acid, etc. are also useful. Similarly, if desired, unsaturated monoepoxy esters such as glycidyl acrylate, glycidyl methacrylate or glycidyl laurate could be used. Additionally, epoxidized oils having an average of one epoxy group per molecule could also be used as monoepoxides.

Other useful monoepoxies include styrene oxide, cyclohexene oxide, 1,2-butene oxide, 2,3-butene oxide, 1,2-pentene oxide, 1,2-heptene oxide, 1,2-octene oxide, 1,2-nonene oxide, 1,2-decene oxide, and the like.

It is only necessary that the monoepoxide compounds have a sufficiently low volatility to remain in the coating composition under the applicable conditions of cure.

Polyepoxides are especially preferred in the reactive coatings of this invention. Especially preferred as the polyfunctional epoxy compounds, due to their reactivity and durability, are the polyepoxy-functional cycloaliphatic epoxies. Preferably, the cycloaliphatic epoxies will have a number average molecular weight less than about 2,000 to minimize the viscosity. The cycloaliphatic epoxies are conveniently prepared by methods well known in the art such as epoxidation of dienes or polyenes, or the epoxidation of unsaturated esters by reaction with a peracid such as peracetic and/or performic acid.

Commercial examples of representative preferred cycloaliphatic epoxies include 3,4-epoxycyclohexylmethyl, 3,4-epoxycyclohexane carboxylate (e.g. "ERL-4221" from Union Carbide Corp.); bis(3,4-epoxycyclohexylmethyl)adipate (e.g. "ERL-4299" from Union Carbide Corporation); 3,4-epoxy-6-methylcyclohexylmethyl 3,4-epoxy-6-methylcyclohexane carboxylate (e.g. "ERL-4201" from Union Carbide Corp.); bis(3,4-epoxy-6-methylcyclohexylmethyl)adipate (e.g. "ERL-4289" from Union Carbide Corp.); bis(2,3-epoxycyclopentyl) ether (e.g. "ERL-0400" from Union Carbide Corp.); dipentene dioxide (e.g. "ERL-4269" from Union Carbide Corp.); 2-(3,4-epoxycyclohexyl-5,5-spiro-3-4-epoxy) cyclohexane-metadioxane (e.g. "ERL-4234" from Union Carbide Corp.). Other commercially available cycloaliphatic epoxies are available from Ciba-Geigy Corporation such as CY 192, a cycloaliphatic diglycidyl ester epoxy resin having an epoxy equivalent weight of about 154. The manufacture of representative cycloaliphatic epoxies is taught in various patents including U.S. Pat. Nos. 2,750,395; 2,884,408; 2,890,194; 3,027,357 and 3,318,822; the teaching of which are hereby incorporated by reference.

Other polyepoxides potentially useful in the practices of this invention include aliphatic and aromatic polyepoxies, such as those prepared by the reaction of an aliphatic polyol or polyhydric phenol and an epihalohydrin. Other useful epoxies include epoxidized oils and acrylic polymers derived from ethylenically unsaturated epoxy-functional monomers such as glycidyl acrylate or glycidyl methacrylate in combination with other copolymerizable monomers such as those listed in Section 1 above. Monomers having acid functionality, or other functionality reactive with epoxide groups should normally not be utilized in the manufacture of the polyepoxide vehicle. It is often desirable to utilize epoxy-functional compounds which are free of hydroxyl groups.

The ratio of acid groups to epoxy groups can be widely varied to give any desired level of crosslinking within the practice of this invention. When the reactive coating system comprises just the acid-functional polymer and a polyepoxide, at least 0.1 acid groups should be present for each epoxy group. It is generally preferred, however, to provide about 0.1 to about 2.0 acid groups for each epoxy group in the reactive system. It is especially preferred to provide about 0.3 to about 1.0 acid groups for each epoxy group.

It is especially preferred in the practice of this invention to include a catalyst for the reaction of epoxy and acid groups. Tertiary amines, secondary amines such as ethyl imidazole, quaternary ammonium salts, and nucleophilic catalysts such as lithium iodide, phosphonium salts, and phosphines such as triphenyl phosphine are especially useful as catalysts for epoxy/acid reactions. The catalyst for the epoxy/acid reaction will typically be present at a level of at least 0.01% by weight of the total acid-functional polymer and epoxy-functional compound and will preferably be present at about 0.1 to about 3.0%.

2.B ANHYDRIDE FUNCTIONAL COMPOUNDS

Useful reactive coating compositions incorporating the acid-functional polymer of this invention and an epoxy-functional compound can also incorporate, if desired, an anhydride-functional compound to alter various performance properties of the final coating. The anhydride-functional compounds which are useful in the practice of this invention can be any aliphatic or aromatic compound having at least two cyclic carboxylic acid anhydride groups in the molecule. Polymeric anhydrides having number average molecular weights between 500 and 7,000 are most useful. Especially preferred in the practice of this invention is the use of acrylic polymers having anhydride functionality. These are conveniently prepared as is well known in the art by the polymerization under free radical addition polymerization conditions of at least one unsaturated monomer having anhydride functionality, such as maleic anhydride, citraconic anhydride, itaconic anhydride, propenyl succinic anhydride, etc. optionally with other ethylenically unsaturated monomers such as the esters of unsaturated acids, vinyl compounds, styrene-based materials, allyl compounds and other copolymerizable monomers, all as representatively taught in Section 1 of this specification.

The monomers which are copolymerized with the unsaturated anhydride should, of course, be free of any functionality which could react with the anhydride group during the polymerization. The anhydride-functional polymers can be conveniently prepared by conventional free radical addition polymerization techniques. Typically the polymerization will be conducted in an inert solvent and in the presence of an initiator at temperatures ranging from 35° C. to about 200° C. The anhydride-functional free radical addition polymers should typically comprise at least 5% by weight of the anhydride. An especially preferred anhydride-functional polymer comprises the free radical addition polymerization product of (a) 5 to 40, and especially 15 to about 25, weight percent of an ethylenically unsaturated monoanhydride and (b) 60 to 95, and especially 75 to about 85, wieght percent of at least one other ethylenically unsaturated monomer copolymerizable with the ethylenically unsaturated anhydride.

Other polyanhydrides, in addition to the anhydride-functional addition polymerization products, can also be utilized in the practice of this invention. Ester anhydrides can be prepared, as is known in the art, by the reaction of e.g. trimellitic anhydride with polyols. Other representative, suitable polyanhydrides include poly-functional cyclic dianhydrides such as cyclopentane tetracarboxylic acid dianhydride, diphenyl-ether tetracarboxylic acid dianhyhdride, 1,2,3,4-butane tetracarboxylic acid dianhydride, and the benzophenone tetracarboxylic dianhydrides such as 3,3',4,4'-benzophenone tetracarboxylic dianhydride, and 2,bromo-3,3',4,4'-benzophenone tetracarboxylic acid dianhydride. Trianhydrides such as the benzene and cyclohexene hexacarboxylic acid trianhydrides are also useful.

Although it is not our intent to be bound by theory, it is believed that in the course of the curing reaction of the components of this invention, that at least some of the acid groups and epoxy groups react to produce ester groups and hydroxyl groups and that at least some of these hydroxyl groups are reacted with the anhydride groups to produce ester groups and additional acid groups. It is, therefore, especially preferred in the practice of this invention to include a catalyst for the reaction of anhydride groups and hydroxyl groups and also a catalyst for the reaction of epoxy and acid groups.

Additionally, useful polyanhydrides can be prepared by the maleinization of polyunsaturated compounds such as unsaturated rubbers, unsaturated oils and unsaturated hydrocarbons. Representative catalysts and their levels have been taught elsewhere in this specification. It is especially preferred in the practice of this invention to utilize tertiary amines and especially N-methylimidazole as a catalyst for the anhydride/hydroxyl reaction. The catalyst for the anhydride/hydroxyl reaction will typically be present at a level of at least 0.01% by weight of the anhydride compound and preferably 1.0 to about 5.0%.

The ratios of anhydride to acid to epoxy groups can be widely varied to give any desired level of crosslinking within the practice of this invention. When the reactive coating system comprises just the acid-functional polymer, the polyepoxide, and the anhydride-functional compound, typically, should be present in an amount to provide at least about 0.01 anhydride groups for each epoxy groups in the reactive coating. It is preferred, however, to provide about 0.1 to about 6.0 acid groups and about 0.6 to about 12.0 epoxy groups and about 0.01 to about 6.0 anhydride groups in the reactive system. An especially preferred formulation range provides 2.0 to about 5.0 acid groups and 3.0 to about 8.0 epoxy groups for each anhydride group.

2.C. HYDROXY-FUNCTIONAL COMPOUNDS

If desired, the reactive coating compositions of this invention which comprise the cellulose ester based acid-functional copolymer, the epoxy-functional compound and the anhydride-functional compound can also incorporate a hydroxy-functional compound. The hydroxy-functional compounds which are useful in the practice of this invention have an average of at least two hydroxyl groups per molecule. Although low molecular weight diols and polyols such as propylene glycol, 1,6-hexanediol, triethanol amine, and pentaerythritol can be utilized in the practice of this invention, it is especially preferred to utilize polymeric hydroxy-functional compounds such as polyethers, polyesters, acrylics, polyurethanes, polycaprolactones, etc.

Preferably the hydroxy-functional polymer will have a number average molecular weight of at least about 400. Typical number average molecular weights will range from about 400 to about 30,000, and especially 1,000 to about 15,000. In order to provide the fastest rate of reaction during cure it is preferred in the practice of this invention to utilize hydroxy-functional compounds having predominantly, and preferably all, primary hydroxyl functionality.

Representative hydroxy-functional polymers include those described in Sections 2.C.1 through 2.C.5 below:

2.C.1. Polyether polyols are well known in the art and are conveniently prepared by the reaction of a diol or polyol with the corresponding alkylene oxide. These materials are commercially available and may be prepared by a known process such as, for example, the processes described in *Encyclopedia of Chemical Technology*, Volume 7, pages 257-262, published by Interscience Publishers, Inc., 1951; and in Kirk-Othmer *Encyclopedia of Chemical Technology*, Volume 18, pages 638, 641, published by Wiley-International, 1982. Representative examples include the polypropylene ether glycols and polyethylene ether glycols such as those marketed as Niax ® Polyols from Union Carbide Corporation.

2.C.2. Another useful class of hydroxy-functional polymers are those prepared by condensation polymerization reaction techniques as are well known in the art. Representative condensation polymerization reactions include polyesters prepared by the condensation of polyhydric alcohols and polycarboxylic acids or anhydrides, with or without the inclusion of drying oil, semi-drying oil, or non-drying oil fatty acids. By adjusting the stoichiometry of the alcohols and the acids while maintaining an excess of hydroxyl groups, hydroxy-functional polyesters can be readily produced to provide a wide range of desired molecular weights and performance characteristics.

The polyester polyols are derived from one or more aromatic and/or aliphatic polycarboxylic acids, the anhydrides thereof, and one or more aliphatic and/or aromatic polyols. The carboxylic acids include the saturated and unsaturated polycarboxylic acids and the derivatives thereof, such as maleic acid, fumaric acid, succinic acid, adipic acid, azelaic acid, and dicyclopentadiene dicarboxylic acid. The carboxylic acids also include the aromatic polycarboxylic acids, such as phthalic acid, isophthalic acid, terephthalic acid, etc. Anhydrides such as maleic anhydride, phthalic anhydride, trimellitic anhydride, or Nadic Methyl Anhydride (brand name for methylbicyclo[2.2.1]heptene-2,3-dicarboxylic anhydride isomers) can also be used.

Representative saturated and unsaturated polyols which can be reacted with the carboxylic acids to produce hydroxyfunctional polyesters include diols such as ethylene glycol, dipropylene glycol, 2,2,4-trimethyl 1,3-pentanediol, neopentyl glycol, 1,2-propanediol, 1,4-butanediol, 1,3-butanediol, 2,3-butanediol, 1,5-pentanediol, 1,6-hexanediol, 2,2-dimethyl-1,3-propanediol, 1,4-cyclohexanedimethanol, 1,2-cyclohexanedimethanol, 1,3-cyclohexanedimethanol, 1,4-bis(2-hydroxyethoxy)cyclohexane, trimethylene glycol, tetramethylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, and polyols such as trimethylolethane, trimethylolpropane, trimethylolhexane, triethylolpropane, 1,2,4-butanetriol, glycerol, pentaerythritol, dipentaerythritol, etc.

Typically, the reaction between the polyols and the polycarboxylic acids is conducted at about 120° C. to about 200° C. in the presence of an esterification catalyst such as dibutyl tin oxide.

2.C.3. Additionally, hydroxy-functional polymers can be prepared by the ring opening reaction of epoxides and/or polyepoxides with primary or, preferably, secondary amines or polyamines to produce hydroxy-functional polymers. Representative amines and polyamines include ethanol amine, N-methylethanol amine, dimethyl amine, ethylene diamine, isophorone diamine, etc. Representative polyepoxides include those prepared by condensing a polyhydric alcohol or polyhydric phenol with an epihalohydrin, such as epichlorohydrin, usually under alkaline conditions. Some of these condensation products are available commercially under the designations EPON or DRH from Shell Chemical Company, and methods of preparation are representatively taught in U.S. Pat. Nos. 2,592,560; 2,582,985 and 2,694,694.

2.C.4. Other useful hydroxy-functional polymers can be prepared by the reaction of at least one polyol, such as those representatively described in Section 2.C.2 above, with polyisocyanates to produce hydroxy-functional urethanes. Representative polyisocyanates having two or more isocyanate groups per molecule include the aliphatic compounds such as ethylene, trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 3-isocyanatomethyl-3,5,5-trimethylcyclohexylisocyanate, and the 1,3-cyclopentane, 1,3-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-toluene, or mixtures thereof, 4,4'-toluidine, and 1,4-xylylene diisocyanates; the nuclear substituted aromatic compounds such as dianisidine diisocyanate, 4,4'-diphenylether diisocyanate and chlorodiphenylene diisocyanate; the triisocyanates such as triphenyl methane-4,4',4"-triisocyanate, 1,3,5-triisocyanate benzene and 2,4,6-triisocyanate toluene; and the tetraisocyanates such as 4,4'-diphenyl-dimethyl methane-2,2'-5,5'-tetraisocyanate; the polymerized polyisocyanates such as tolylene diisocyanate dimers and trimers, and other various polyisocyanates containing biuret, urethane, and/or allophanate linkages. The polyisocyanates and the polyols are typically reacted at temperatures of 25° C. to about 150° C. to form the hydroxy-functional polymers.

2.C.5. Useful hydroxy-functional polymers can also be conveniently prepared by free radical polymerization techniques such as in the production of acrylic resins. The polymers are typically prepared by the addition polymerization of one or more monomers. At least one of the monomers will contain, or can be reacted to produce, a reactive hydroxyl group. Representative hydroxy-functional monomers include 2-hydroxyethyl acrylate, 2-hydroxypropyl acrylate, 4-hydroxybutyl methacrylate, 2-hydroxypropyl methacrylate, 3-hydroxybutyl acrylate, 4-hydroxypentyl acrylate, 2-hydroxyethyl ethacrylate, 3-hydroxybutyl methacrylate, 2-hydroxyethyl chloroacrylate, diethylene glycol methacrylate, tetraethylene glycol acrylate, para-vinyl benzyl alcohol, etc. Typically the hydroxy-functional monomers would be copolymerized with one or more monomers having ethylenic unsaturation such as those monomers taught in paragraphs (a) through (f) in Section 1 of this specification.

The acrylics are conveniently prepared by conventional free radical addition polymerization techniques. Frequently, the polymerization will be catalyzed by conventional initiators known in the art to generate a free radical such as azobis(isobutyronitrile), cumene hydroperoxide, t-butyl perbenzoate, etc. Typically, the unsaturated monomers are heated in the presence of the free radical initiator at temperatures ranging from about 35° C. to about 200° C., and especially 100° C. to 160° C., to effect the polymerization. The molecular weight of the polymer can be controlled, if desired, by the monomer selection, reaction temperature and time, and/or the use of chain transfer agents as is well known in the art.

Especially preferred in the practice of this invention are hydroxy-functional polyesters and hydroxy-functional acrylic polymers. An especially preferred hydroxy-functional polymer is the addition polymerization reaction product of (a) 10 to about 40 weight percent of a hydroxy-functional ethylenically unsaturated monomer and (b) 60 to about 90 weight percent of at least one ethylenically unsaturated monomer copolymerizable with the hydroxy-functional monomer. When the reactive coating composition incorporates a polyanhydride functional compound along with the cellulose ester based acid-functional polymer and the epoxy-functional compound, the ratios of acid to epoxy to anhydride groups can be widely varied to give any desired level of crosslinking within the practice of this invention. It is especially preferred, however, to provide about 0.3 to about 6.0 acid groups and about 0.6 to about 12.0 epoxy groups for each anhydride group in the reactive system. It is especially preferred to provide 2.0 to about 5.0 acid groups and 3.0 to about 8.0 epoxy groups for each anhydride group.

Similarly, when the reactive coating system incorporates a hydroxy-functional compound along with the acid-functional polymer, the epoxy-functional compound, and polyanhydride compound, and the relative levels of each of these reactive groups may also be widely varied within the practice of this invention. It is preferred, however, to provide about 0.05 to about 3.0 acid groups and about 0.5 to about 4.0 epoxy groups and about 0.5 to about 6.0 hydroxyl groups for each anhydride group in the reactive system. An especially preferred formulation range provides 1.0 to about 2.0 acid groups and 1.0 to about 3.0 epoxy groups and about 1.0 to about 4.0 hydroxyl groups for each anhydride group.

It is especially preferred in the practice of this invention when using anhydride-functional compounds in combination with the cellulose ester based acid-functional polymers and epoxy-functional compounds to include a catalyst for the reaction of the epoxy and acid groups and a catalyst for the reaction of anhydride groups and hydroxyl groups as taught in this specification. It is especially preferred in the practice of this invention to utilize tertiary amines and especially N-methylimidazole as a catalyst for the anhydride/hydroxyl reaction. The catalyst for the anhydride/hydroxyl reaction will typically be present at a level of at least 0.01% by weight of the anhydride compound and preferably 1.0 to about 5.0%.

Tertiary amines, secondary amines such as ethyl imidazole, quaternary ammonium salts, nucleophilic catalysts, such as lithium iodide, phosphonium salts, and phosphines such as triphenyl phosphine are especially useful as catalysts for epoxy/acid reactions. The catalyst for the epoxy/acid reaction will typically be present at a level of at least 0.01% by weight of the total acid-functional compound and epoxy-functional compound and will be present at 0.1 to about 3.0%.

If desired, more than one of any of the acid-functional, anhydride-functional, epoxy-functional or hydroxy-functional compounds could be utilized in a single coating formulation.

The coatings of this invention can be cured at temperatures ranging from about room temperature up to about 350° F. The coatings can be used as clear coatings and/or they may contain pigments as is well known in the art. Representative opacifying pigments include white pigments such as titanium dioxide, zinc oxide, antimony oxide, etc. and organic or inorganic chromatic pigments such as iron oxide, carbon black, phthalocyanine blue, etc. The coatings may also contain extender pigments such as calcium carbonate, clay, silica, talc, etc.

The coatings may also contain other additives such as flow agents, catalysts, diluents, solvents, ultraviolet light absorbers, etc.

Since the curable compositions of this invention are typically provided as multi-package systems which must be mixed together prior to use, the pigments, catalysts and other additives can be conveniently added to any or all of the individual packages.

The coatings of this invention may typically be applied to any substrate such metal, plastic, wood, glass, synthetic fibers, etc. by brushing, dipping, roll coating, flow coating, spraying or other method conventionally employed in the coating industry.

One preferred application of the curable coatings of this invention relates to their use as clearcoats and/or basecoats in clearcoat/basecoat formulations.

Clearcoat/basecoat systems are well known, especially in the automobile industry where it is especially useful to apply a pigmented basecoat, which may contain metallic pigments, to a substrate and allow it to form a polymer film followed by the application of a clearcoat which will not mix with or have any appreciable solvent attack upon the previously applied basecoat. The basecoat composition may be any of the polymers known to be useful in coating compositions including the reactive compositions of this invention.

One useful polymer basecoat includes the acrylic addition polymers, particularly polymers or copolymers of one or more alkyl esters of acrylic acid or methacrylic acid, optionally together with one or more other ethylenically unsaturated monomers. These polymers may be of either the thermoplastic type or the thermosetting, crosslinking type which contain hydroxyl or amine or other reactive functionality which can be crosslinked. Suitable acrylic esters and unsaturated monomers for either type of polymer include methyl methacrylate, ethyl methacrylate, propyl methacrylate, butyl methacrylate, ethyl acrylate, butyl acrylate, vinyl acetate, acrylonitrile, acrylamide, styrene, vinyl chloride, etc. Where the polymers are required to be of the crosslinking type, suitable functional monomers which can be used in addition to those already mentioned include acrylic or methacrylic acid, hydroxy ethyl acrylate, 2-hydroxy propyl methacrylate, glycidyl acrylate, tertiary-butyl amino ethyl methacrylate, etc. The basecoat composition may, in such a case, also contain a crosslinking agent such as a polyisocyanate, a polyepoxide, or a nitrogen resin such as a condensate of an aldehyde such as formaldehyde with a nitrogeneous compound such as urea, melamine or benzoguanamine or a lower alkyl ether of such a condensate. Other polymers useful in the basecoat composition include vinyl copolymers such as copolymers of vinyl esters of inorganic or organic acids, such as vinyl chloride, vinyl acetate, vinyl propionate, etc., which copolymers may optionally be partially hydrolyzed so as to introduce vinyl alcohol units.

Other polymers useful in the manufacture of the basecoat include alkyd resins or polyesters which can be prepared in a known manner by the condensation of polyhydric alcohols and polycarboxylic acids, with or without the inclusion of natural drying oil fatty acids as described elsewhere in this specification. The polyesters or alkyds may contain a proportion of free hydroxyl and/or carboxyl groups which are available for reaction, if desired with suitable crosslinking agents as discussed above.

If desired, the basecoat composition may also contain minor amounts of a cellulose ester, to alter the drying or viscosity characteristics of the basecoat.

Typically, the basecoat will include pigments conventionally used for coating compositions and after being applied to a substrate, which may or may not previously have been primed, the basecoat will be allowed sufficient time to form a polymer film which will not be lifted during the application of the clearcoat. The basecoat may be heated or merely allowed to air-dry to form the film. Generally, the basecoat will be allowed to dry for about 1 to 20 minutes before application of the clearcoat. The clearcoat is then applied to the surface of the basecoat, and the system can be allowed to dry at room temperature or, if desired, can be force dried by baking the coated substrate at temperatures typically ranging up to about 350° F.

Typically, the clearcoat may contain ultraviolet light absorbers such as hindered phenols or hindered amines at a level ranging up to about 6% by weight of the vehicle solids as is well known in the art. The clearcoat can be applied by any application method known in the art, but preferably will be spray applied. If desired, multiple layers of basecoat and/or clearcoat can be applied. Typically, both the basecoat and the clearcoat will each be applied to give a dry film thickness of about 0.01 to about 6, and especially about 0.5 to about 3.0 mils.

If desired, the novel reactive compositions taught herein could be used as a basecoat, in which case the clearcoat could also comprise the novel reactive coatings taught herein, or other polymers, including the polymers taught herein as being useful as basecoat formulations could be utilized as clearcoats.

The following examples have been selected to illustrate specific embodiments and practices of advantage to a more complete understanding of the invention. Unless otherwise stated, "parts" means parts-by-weight and "percent" is percent-by-weight. The numeric ratings for solvent resistance (MEK rubs), wet adhesion, and salt spray are on a scale of 0–10, 10 best.

EXAMPLE 1

A reaction vessel equipped with a nitrogen inlet, condenser, and mechanical stirrer was charged with 1,501.3 parts xylene and 215.1 parts CAB 551-0.01[1] and heated to reflux. Over a three hour period a monomer mixture comprising 129.2 parts TONE ® M-100[2]; 300.5 parts hydroxyethyl methacrylate; 621.9 parts isobutyl methacrylate; 466.3 parts styrene; 155.6 parts methyl methacrylate; and 9.7 parts t-butyl peroctoate were added to the reaction vessel while maintaining the reaction mixture at reflux with vigorous stirring under a nitrogen blanket. Upon the completion of the monomer addition, the reaction was maintained for an additional 15 minutes at reflux followed by the gradual addition over a 30 minute period of 3.8 parts t-butyl peroctoate in 10.0 parts xylene. After the addition of the initiator was completed, the reaction was maintained at reflux temperatures for an additional two hours and then allowed to cool. The hydroxy-functional polymer prepared by this process exhibited an NVM of approximately 52.1% and gel permeation chromatography analysis indicated it was a graft copolymer of CAB and the unsaturated monomers.

[1] Cellulose ester produced by Eastman Chemical Products, Inc. having a butyryl content, average weight percent of 53; acetyl content, average weight percent 2; hydroxyl content, average weight percent 1.5; a viscosity of 0.01 seconds as measured according to ASTM D 817 and D 1343; and a number average molecular weight, based upon polystyrene standard using gel permeation chromatography of 16,000.
[2] Tradename of Union Carbide's hydroxy-functional acrylic/caprolactone adduct believed to be the reaction product of 1 mole of hydroxyethyl acrylate and 2 moles of caprolactone.

A reaction vessel equipped as described above was charged with 3,373.1 parts of the hydroxy-functional polymer prepared above along with 261.0 parts maleic anhydride and 163.8 parts xylene. The reaction mixture was heated to 60° C. and 2.7 parts triethyl amine in 45.0 parts xylene were gradually added to the reaction mixture over a 30 minute period. The reaction mixture was maintained at 60° C. under a nitrogen blanket with vigorous stirring for about 6 hours. The acid-functional polymer produced by this reaction had an acid value of approximately 69 and showed excellent color and clarity as a 50% solution in xylene or in a mixture of 4:1 xylene:isopropanol.

COMPARATIVE EXAMPLE A

In a manner similar to that described in Example 1, a hydroxy-functional polymer was prepared having the following composition:

| Raw Material | Parts |
| --- | --- |
| Tone ® M-100 | 7.72 |
| Hydroxyethyl Methacrylate | 17.95 |
| Isobutyl Methacrylate | 37.17 |
| Styrene | 27.87 |
| Methyl Methacrylate | 9.30 |

A reaction vessel equipped as described in Example 1 was charged with 2,467.4 parts of the hydroxy-functional polymer of this Example; 215.6 parts maleic anhydride; and 127.5 parts xylene and heated to 60° C. Over a 30 minute period a solution of 2.2 parts triethyl amine in 45.0 parts xylene was added to the reaction mixture with vigorous stirring under a nitrogen blanket. After the amine addition was completed, the reaction mixture was held for 6 hours at 60° C. After the polymerization was complete, 176.1 parts of CAB 551-0.01 in 140.9 parts xylene was added to the reaction mixture which was maintained at 60° C. for about 35 minutes to allow for complete mixing and then allowed to cool.

This example corresponds to the acid-functional polymer of Example 1 except that the CAB was not copolymerized nor was the CAB reacted with the maleic anhydride.

COMPARATIVE EXAMPLE B

A reaction vessel was charged with 1,845.6 parts of the hydroxy-functional polymer prepared in Comparative Example A. The vessel was also charged with 131.8 parts EAB 551-0.01 and 105.5 parts xylene and was heated to reflux under a nitrogen blanket with vigorous stirring. Once the resin mixture cleared, the temperature was reduced to about 30° C. and 159.7 parts maleic anhydride in 82.8 parts xylene was added to the resin mixture and heated to 60° C. Over a 30 minute period a solution of 1.6 parts triethyl amine in 45.0 parts xylene was added dropwise to the reaction mixture. The reaction mixture was then held for 6 hours at 60° C. and then allowed to cool. This comparative example is similar to Example 1 except that the CAB was not copolymerized with the monomers during the preparation of the hydroxy-functional polymer.

Analytical tests indicated that, although the polymer of Example 1 was a graft copolymer of the CAB and the ethylenically unsaturated monomers, neither of the Comparative Examples were graft copolymers.

Differential scanning calorimetry curves identified a single $T_g$ at 61° C. for the copolymer produced as described in Example 1. This indicates the presence of a CAB/acrylic graft copolymer. Comparative Examples A and B showed two different transition temperatures, typically at about 63° C. and 113° C., which correspond to the acrylic polymer and the CAB, respectively, indicating that they are not copolymerized. Additionally, the viscosity of solvent solutions of Example 1 were significantly lower than solvent solutions of the acid-functional resins of the Comparative Examples as shown below:

| Example | Gardner-Holdt Viscosity (stokes) | |
| --- | --- | --- |
| | 50% Solids in Xylene | 50% Solids in 4:1 Xylene:Isopropanol |
| Example 1 | 55 | 9 |
| Comparative Example A | 71 | 14 |
| Comparative Example B | 60 | 12.5 |

EXAMPLE 2

PREPARATION OF CLEAR COATING

A curable clear coating was prepared according to the following recipe:

| Raw Material | Parts |
| --- | --- |
| Acid-Functional Resin of Example 1 | 539.60 |
| ERL 4299 (Union Carbide trade name for bis(3,4-epoxycyclohexylmethyl)adipate) | 101.05 |
| Xylene | 125.93 |
| BYK 300[1] | 2.5 |
| 20% Solution of triphenylphosphine in Toluene | 18.54 |
| 20% Tinuvin 328[2] in Toluene | 23.17 |
| Tinuvin 292[3] | 2.80 |

[1] flow control agent sold by Byk-Malinkrodt
[2] trademark of Ciba-Geigy for 2-2(hydroxy-3,5 ditertiary amyl-ohenol)-2H-benzotriazole
[3] trademark of Ciba-Geigy for di[4(2,2,6,6-tetramethyl piperdinyl)]sebacate This clear coating formulation represents approximately 1.5 epoxy groups per carboxylic acid group. The triphenylphosphine catalyst was present at approximately 1% by weight on epoxy and carboxylic acid vehicle solids.

The clear coating of this Example was reduced 100% with isopropyl acetate and spray applied over an iron phosphate treated steel substrate which had been primed with G.B.P. ® etching primer filler (2-component vinyl-butyral based primer commercially available from The Sherwin-Williams Company) and coated with a basecoat of Acrylyd ® acrylic enamel (a lacquer-like coating commercially available from The Sherwin-Williams Company). The primer, the basecoat and the clearcoat were applied to provide dry film thickness of 1.0, 1.0 and 2.0 mils respectively. This coating system was allowed to ambient cure for 24 hours before testing.

The resultant film exhibiting Konig Pendulum Hardness reading of 13 after one day, 36 after one week, and 43 after four weeks. The coating exhibited a solvent resistance (MEK rubs) rating of 5 after one day and 9 after four weeks. The coated panels exhibited a 20° gloss reading of 98. After 170 hours exposure in a humidity cabinet, the coating maintained 76% of its initial 20° gloss. The coated panels exhibited a wet adhesion rating of 9 and resistance to corrosion after 170 hours exposure in a 5% salt spray cabinet of 8.

EXAMPLE 3

A reaction vessel equipped as shown in Example 1 was charged with 800 parts xylene and 400 parts XAB-12[1] and heated to reflux. Over a three hour period a monomer mixture comprising 175.2 parts hydroxylethyl acrylate; 175.2 parts TONE ® M-100; 490.7 parts methyl methacrylate; 560.8 parts isobutyl methacrylate; 973.6 parts xylene; and 16 parts t-butyl perbenzoate were added to the reaction vessel while maintaining the reaction mixture at reflux with vigorous stirring under a nitrogen blanket. Upon the completion of the monomer addition, the reaction was maintained for an additional 15 minutes at reflux followed by the gradual addition over a 30 minute period of 4.0 parts t-butyl perbenzoate in 28.4 parts xylene. After the addition of the initiator was completed, the reaction was maintained at reflux temperatures for an additional one hour and then allowed to cool.

[1] Carboxylated cellulose acetate butyrate resin produced by Eastman Chemical Products, Inc. having a butyryl content, average weight percent of 32; acetyl content, average weight percent, of about 13; hydroxyl content, average weight percent of about 1.8; carboxyl content, average weight percent 0.95; and a number average molecular weight, based upon polystyrene of 5,650; weight average molecular weight of 11,800 and z average molecular weight of 20,800.

The hydroxy-functional polymer prepared as described above was admixed with 197.9 parts xylene and 197.9 parts maleic anhydride and 4.1 parts triethyl amine and heated to 60° C. The reaction mixture was maintained at 60° C. under a nitrogen blanket with vigorous stirring for approximately six hours to provide the acid functional polymer.

EXAMPLE 4

PREPARATION OF CARBOXYLIC ACID FUNCTIONAL RESIN

A reaction vessel equipped as described in Example 1 was charged with 800 parts xylene and 400 parts XAB-20[1] and heated to reflux. Over a three hour period a monomer mixture comprising 175.2 parts hydroxylethyl acrylate; 175.2 parts TONE® M-100; 490.7 parts methyl methacrylate; 560.8 parts isobutyl methacrylate; 973.6 parts xylene; and 16 parts t-butyl perbenzoate were added to the reaction vessel while maintaining the reaction mixture at reflux with vigorous stirring under a nitrogen blanket. Upon the completion of the monomer addition, the reaction was maintained for an additional 15 minutes at reflux followed by the graudual addition over a 30 minute period of 4 parts t-butyl perbenzoate in 28.4 parts xylene. After the addition of the initiator was completed, the reaction was maintained at reflux temperatures for an additional one hour and then allowed to cool.

[1] Carboxylated cellulose ester produced by Eastman Chemical Products, Inc. having a butryl content, average weight percent of 31.5; acetyl content, average weight percent 13.5; hydroxyl content, average weight percent 1.8; carboxyl content, average weight percent 1.6; a number average molecular weight of 2,750; a weight average molecular weight of 5,730; and a z average molecular weight of 11,200.

To the hydroxy-functional copolymer prepared as described above was added 197.9 parts xylene; 197.9 parts maleic anhydride; and 4.1 parts triethyl amine. The reaction mixture was maintained at 60° C. under a nitrogen blanket with vigorous stirring for about six hours to produce the acid-functional polymer.

EXAMPLE 5

PREPARATION OF ANHYDRIDE FUNCTIONAL-POLYMER

A 4 neck, round bottomed flask equipped with mechanical stirrer, reflux condenser, thermometer, nitrogen inlet and fluid metering pump was charged with 1472 parts xylene, 240 parts maleic anhydride and heated to reflux (139° C.) under nitrogen. A monomer mixture of 480 parts isobutyl methacrylate, 720 parts butyl acrylate, 720 parts methyl methacrylate, 120 parts maleic anhydride and 60 parts t-butyl perbenzoate were then metered into the reaction over a 3-hour period. Halfway through the addition, an additional 120 parts of maleic anhydride was charged to the reaction vessel and monomer addition was continued. After refluxing the reaction mixture for an additional 15 minutes, 12 parts of t-butyl perbenzoate in 128 parts xylene were added over 45 minutes. Heating was continued for 2 hours at reflux. The resulting xylene soluble anhydride-functional resin was 61.2% solids, had a Gardner Holdt viscosity of 24.5, an acid value of 116.5, and a density of approximately 8.6 pounds per gallon.

EXAMPLE 6

PREPARATION OF HYDROXYY-FUNCTIONAL POLYMER

A hydroxy-functional polymer was prepared by initially charging a polymerization reactor equipped with a mechanical stirrer, a water cooled condenser, nitrogen inlet, water trap, thermometer, heating mantle and fluid metering pump with 172.5 parts of n-butyl acetate. The reaction vessel was heated to approximately 237° F. and a monomer premix composed of 96.2 parts of methyl methacrylate, 63.0 parts of butyl acrylate, 58 parts of hydroxy ethyl methacrylate, 54 parts styrene and an initiator premixture composed of 11.5 parts of n-butyl acetate and 5.7 parts of Vazo 67 was metered simultaneously into the polymerization reactor at a constant rate over approximately 4 hours. The reaction temperature was maintained for an additional 2 hours after the addition was completed and cooled for one hour. The resulting hydroxy-functional polymer had a number average molecular weight of approximately 9,600.

EXAMPLE 7

PREPARATION OF CLEAR COATING

A curable clear coating can be prepared according to the following recipe:

| Raw Material | Parts |
| --- | --- |
| Acid-Functional Polymer of Example 3 | 400.00 |
| Anhydride-Functional Polymer of Example 5 | 130.00 |
| ERL 4299 | 105.00 |
| BYK 300 | 2.5 |
| Xylene | 50.00 |
| Methyl Ethyl Ketone | 100.00 |
| 10% Triphenylphosphine/toluene | 30.00 |
| 10% N-methylimidazole/methyl isobutyl ketone | 30.00 |

EXAMPLE 8

PREPARATION OF CLEAR COATING

A curable clear coating can be prepared according to the following recipe:

| Raw Material | Parts |
| --- | --- |
| Hydroxy-Functional Polymer of Example 6 | 170.00 |
| ERL 4221[1] | 55.00 |
| Acid-Functional Polymer of Example 4 | 430.00 |
| Xylene | 35.00 |
| Toluene | 45.00 |
| Byk 300 | 2.5 |
| 20% N-Methylimidazole/Methyl Isobutyl Ketone | 5.0 |
| 20% Triphenylphosphine/Toluene | 13.19 |
| Tinuvin 292 | 2.9 |
| 20% Tinuvin 328/Toluene | 25.00 |
| Anhydride-Functional Polymer of Example 5 | 46.00 |

[1] Union Carbide trademark for 3,4-epoxycyclohexylmethyl 3,4-epoxycyclohexane carboxylate While this invention has been described by a specific number of embodiments, it is obvious that other variations and modifications may be made without departing from the spirit and scope of the invention as set forth in the appended claims.

The invention claimed is:

1. A curable composition which comprises:
   (a) an acid-functional polymer having an average of at least two carboxylic acid groups per molecule wherein the acid-functional polymer comprises the reaction products obtained by reacting:
      (i) a hydroxy-functional polymer having an average of at least two hydroxyl groups per molecule; and
      (ii) a monomeric aliphatic or aromatic cyclic anhydride having one anhydride group per molecule under reaction conditions to produce acid groups and ester groups; and wherein the hydroxy-functional polymer is obtained by the copolymerization of:
(A) 1-95 weight percent of a cellulose ester; and
(B) 5-99 weight percent of at least one ethylenically unsaturated alcohol copolymerizable with the cellulose ester; and
(C) 0-94 weight percent of at least one other ethylenically unsaturated monomer copolymerizable with the cellulose ester and the ethylenically unsaturated alcohol; and (b) an epoxy-functional compound.

2. In a substrate coated with a multi-layer decorative and/or protective coating which comprises:
(a) a basecoat comprising a pigmented film-forming polymer; and
(b) a transparent clearcoat comprising a film-forming polymer applied to the surface of the basecoat composition;

the improvement which comprises utilizing as the clearcoat and/or the basecoat a multicomponent curable composition which is reactive upon mixing of the components, wherein the curable composition comprises:
(i) an acid-functional polymer having an average of at least two carboxylic acid groups per molecule wherein the acid-functional polymer comprises the reaction products obtained by reacting:
(A) a hydroxy-functional polymer having an average of at least two hydroxyl groups per molecule; and
(B) a monomeric aliphatic or aromatic cyclic anhydride having one anhydride group per molecule under reaction conditions to produce acid groups and ester groups; and wherein the hydroxy-functional polymer is obtained by the copolymerization of:
(1) 1-95 weight percent of a cellulose ester; and
(2) 5-99 weight percent of at least one ethylenically unsaturated alcohol copolymerizable with the cellulose ester; and
(3) 0-94 weight percent of at least one other ethylenically unsaturated monomer copolymerizable with the cellulose ester and the ethylenically unsaturated alcohol; and (ii) an epoxy-functional compound.

3. In a substrate coated with a multi-layer decorative and/or protective coating which comprises:
(a) a basecoat comprising a pigmented film-forming polymer; and
(b) a transparent clearcoat comprising a film-forming polymer applied to the surface of the basecoat composition;

the improvement which comprises utilizing as the clearcoat and/or the basecoat a multicomponent curable composition which is reactive upon mixing of the components, wherein the curable composition comprises:
(i) an acid-functional polymer having an average of at least two carboxylic acid groups per molecule wherein the acid-functional polymer comprises the reaction products obtained by reacting:
(A) a hydroxy-functional polymer having an average of at least two hydroxyl groups per molecule; and
(B) a monomeric aliphatic or aromatic cyclic anhydride having one anhydride group per molecule under reaction conditions to produce acid groups and ester groups; and wherein the hydroxy-functional polymer is obtained by the copolymerization of:
(1) 1-95 weight percent of a cellulose ester; and
(2) 5-99 weight percent of at least one ethylenically unsaturated alcohol copolymerizable with the cellulose ester; and
(3) 0-94 weight percent of at least one other ethylenically unsaturated monomer copolymerizable with the cellulose ester and the ethylenically unsaturated alcohol; and (ii) an epoxy-functional compound; and
(iii) an anhydride-functional compound having an average of at least two anhydride groups per molecule.

4. In a substrate coated with a multi-layer decorative and/or protective coating which comprises:
(a) a basecoat comprising a pigmented film-forming polymer; and
(b) a transparent clearcoat comprising a film-forming polymer applied to the surface of the basecoat composition;

the improvement which comprises utilizing as the clearcoat and/or the basecoat a multicomponent curable composition which is reactive upon mixing of the components, wherein the curable composition comprises:
(i) an acid-functional polymer having an average of at least two carboxylic acid groups per molecule wherein the acid-functional polymer comprises the reaction products obtained by reacting:
(A) a hydroxy-functional polymer having an average of at least two hydroxyl groups per molecule; and
(B) a monomeric aliphatic or aromatic cyclic anhydride having one anhydride group per molecule under reaction conditions to produce acid groups and ester groups; and wherein the hydroxy-functional polymer is obtained by the copolymerization of:
(1) 1-95 weight percent of a cellulose ester; and
(2) 5-99 weight percent of at least one ethylenically unsaturated alcohol copolymerizable with the cellulose ester; and
(3) 0-94 weight percent of at least one other ethylenically unsaturated monomer copolymerizable with the cellulose ester and the ethylenically unsaturated alcohol; and (ii) an epoxy-functional compound; and
(iii) an anhydride-functional compound having an average of at least two anhydride groups per molecule; and
(iv) a hydroxy-functional compound having an average of at least two hydroxyl groups per molecule.

5. The curable composition of claim 1 wherein the acid functional polymer is further characterized in that the monomeric cyclic anhydride is maleic anhydride.

6. The curable composition of claim 1 wherein the acid-functional polymer is further characterized in that the hydroxy functional polymer and the monomeric cyclic anhydride which are reacted to produce the acid functional polymer are each present at a level to provide at least about 0.3 anhydride groups for each hydroxyl group in the hydroxy functional polymer.

7. The curable composition of claim 6 wherein the acid functional polymer is further characterized in that the hydroxy-functional polymer and the cyclic anhydride which are reacted to produce the acid-functional polymer are each present at a level to provide about 0.3 to 1.0 anhydride groups for each hydroxyl group in the hydroxyl-functional polymer.

8. The curable composition of claim 1 wherein the acid-functional polymer is further characterized in that the hydroxy-functional polymer is obtained by the copolymerization of:
   (a) 1-35 weight percent of a cellulose ester; and
   (b) 5-99 weight percent of at least one ethylenically unsaturated alcohol copolymerizable with the cellulose ester; and
   (c) 0-94 weight percent of at least one other ethylenically unsaturated monomer copolymerizable with the cellulose ester and the ethylenically unsaturated alcohol.

9. The curable composition of claim 1 wherein the acid-functional polymer is further characterized in that the hydroxy-functional polymer is obtained by the copolymerization of:
   (a) 1-35 weight percent of a cellulose ester; and
   (b) 5-35 weight percent of at least one ethylenically unsaturated alcohol copolymerizable with the cellulose ester; and
   (c) 1-50 weight percent styrene; and
   (d) 0-93 weight percent of at least one other ethylenically unsaturated monomer copolymerizable with the cellulose ester and the ethylenically unsaturated alcohol.

10. The curable composition of claim 1 wherein the acid-functional polymer is further characterized in that the cellulose ester is cellulose acetate butyrate.

11. The curable composition of claim 1 wherein the acid-functional polymer is further characterized in that the cellulose ester is a carboxylated cellulose ester.

12. The curable composition of claim 1 wherein the epoxy-functional compound is further characterized in that the epoxy groups are cycloaliphatic epoxy groups.

13. The curable composition of claim 12 wherein the cycloaliphatic epoxy-functional compound is selected from the groug consisting of 3,4-epoxy-cyclohexyl-methyl 3,4-epoxycyclohexane carboxylate, 3,4-epoxy-6-methylcyclohexylmethyl 3,4-epoxy-6-methylcyclohexane carboxylate, bis (3,4-epoxy-6-methylcyclohexylmethyl) adipate, bis (2,3-epoxycyclopentyl) ether, dipentene dioxide, 2-(3,4-epoxycyclohexyl-5,5-spiro-3,4-epoxy) cyclohexanemetadioxane and bis(3,4-epoxycyclohexylmethyl) adipate.

14. The curable composition of claim 1 wherein the epoxy functional compound has an average of at least two epoxy groups per molecule.

15. A curable composition which comprises:
   (a) an acid-functional polymer having an average of at least two carboxylic acid groups per molecule wherein the acid-functional polymer comprises the reaction products obtained by reacting:
      (i) a hydroxy-functional polymer having an average of at least two hydroxyl groups per molecule; and
      (ii) a monomeric aliphatic or aromatic cyclic anhydride having one anhydride group per molecule under reaction conditions to produce acid groups and ester groups; and
   wherein the hydroxy-functional polymer is obtained by the copolymerization of:
      (A) 1-95 weight percent of a cellulose ester; and
      (B) 5-99 weight percent of at least one ethylenically unsaturated alcohol copolymerizable with the cellulose ester; and
      (C) 0-94 weight percent of at least one other ethylenically unsaturated monomer copolymerizable with the cellulose ester and the ethylenically unsaturated alcohol; and
   (b) an epoxy-functional compound; and
   (c) an anhydride functional compound having an average of at least two cyclic carboxylic acid anhydride groups per molecule.

16. The curable composition of claim 15 further characterized in that the epoxy-functional compound is a mono epoxide.

17. The curable composition of claim 15 further characterized in that the epoxy-functional compound has an average of at least two epoxy groups per molecule.

18. The curable composition of claim 15 further characterized in that the anhydride-functional compound is an anhydride-functional polymer having a number average molecular weight of at least about 500.

19. The curable composition of claim 15 further characterized in that the anhydride-functional compound is an anhydride-functional polymer which is the addition polymerization reaction product of at least one ethylenically unsaturated anhydride and at least one other ethylenically unsaturated monomer.

20. The curable composition of claim 19 wherein the anhydride-functional addition polymer is further characterized in that the ethylenically unsaturated anhydride is maleic anhydride.

21. The curable composition of claim 19 wherein the anhydride-functional polymer is the addition polymerization reaction product of (a) 5 to about 40 weight percent of an ethylenically unsaturated monoanhydride and (b) 60 to 95 weight percent of at least one other ethylenically unsaturated monomer copolymerizable with the ethylenically unsaturated anhydride.

22. A curable composition comprises:
   (a) an acid-functional polymer having an average of at least two carboxylic acid groups per molecule wherein the acid-functional polymer comprises the reaction products obtained by reacting:
      (i) a hydroxy-functional polymer having an average of at least two hydroxyl groups per molecule; and
      (ii) a monomeric aliphatic or aromatic cyclic anhydride having one anhydride group per molecule under reaction conditions to produce acid groups and ester groups; and
   wherein the hydroxy-functional polymer is obtained by the copolymerization of:
      (A) 1-95 weight percent of a cellulose ester; and
      (B) 5-99 weight percent of at least one ethylenically unsaturated alcohol copolymerizable with the cellulose ester; and
      (C) 0-94 weight percent of at least one other ethylenically unsaturated monomer copolymerizable with the cellulose ester and the ethylenically unsaturated alcohol; and
   (b) an epoxy-functional compound; and
   (c) an anhydride functional compound having an average of at least two cyclic carboxylic acid anhydride groups per molecule; and
   (d) a hydroxy functional compound having an average of at least two hydroxyl groups per molecule.

23. The curable composition of claim 22 further characterized in that the hydroxy functional compound (d) is a hydroxy-functional polymer having a number average molecular weight of at least 400.

24. The curable composition of claim 23 further characterized in that the hydroxy-functional polymer is selected from the group consisting of hydroxy-functional polyethers, poly esters, acrylic polymers, polyurethanes and polycaprolactones.

25. The curable composition of claim 23 wherein the hydroxy-functional polymer is further characterized as the addition polymerization reaction product of (a) 10 to about 60 weight percent of a hydroxy-functional ethylenically unsaturated monomer and (b) 40 to about 90 weight percent of at least one ethylenically unsaturated monomer copolymerizable with the hydroxy-functional monomer.

26. The coated substrate of claim 2 wherein the acid functional polymer is further characterized in that the monomeric cyclic anhydride is maleic anhydride.

27. The coated substrate of claim 2 wherein the acid-functional polymer is further characterized in that the hydroxy functional polymer and the monomeric cyclic anhydride which are reacted to produce the acid functional polymer are each present at a level to provide at least about 0.3 anhydride groups for each hydroxyl group in the hydroxy functional polymer.

28. The coated substrate of claim 27 wherein the acid functional polymer is further characterized in that the hydroxy-functional polymer and the cyclic anhydride which are reacted to produce the acid-functional polymer are each present at a level to provide about 0.3 to 1.0 anhydride groups for each hydroxyl group in the hydroxy-functional polymer.

29. The coated substrate of claim 2 wherein the acid-functional polymer is further characterized in that the hydroxy-functional polymer is obtained by the copolymerization of:
(a) 1-35 weight percent of a cellulose ester; and
(b) 5-99 weight percent of at least one ethylenically unsaturated alcohol copolymerizable with the cellulose ester; and
(c) 0-94 weight percent of at least one other ethylenically unsaturated monomer copolymerizable with the cellulose ester and the ethylenically unsaturated alcohol.

30. The coated substrate of claim 2 wherein the acid-functional polymer is further characterized in that the hydroxy-functional polymer is obtained by the copolymerization of:
(a) 1-35 weight percent of a cellulose ester; and
(b) 5-35 weight percent of at least one ethylenically unsaturated alcohol copolymerizable with the cellulose ester; and
(c) 1-50 weight percent styrene; and
(d) 0-93 weight percent of at least one other ethylenically unsaturated monomer copolymerizable with the cellulose ester and the ethylenically unsaturated alcohol.

31. The coated substrate of claim 2 wherein the acid-functional polymer is further characterized in that the cellulose ester is cellulose acetate butyrate.

32. The coated substrate of claim 2 wherein the acid-functional polymer is further characterized in that the cellulose ester is a carboxylated cellulose ester.

33. The coated substrate of claim 2 wherein the epoxy-functional compound is further characterized in that the epoxy groups are cycloaliphatic epoxy groups.

34. The coated substrate of claim 33 wherein the cycloaliphatic epoxy-functional compound is selected from the group consisting of 3,4-epoxy-cyclohexylmethyl 3,4-epoxycyclohexane carboxylate, 3,4-epoxy-6-methylcyclohexylmethyl 3,4-epoxy-6-methylcyclohexane carboxylate, bis (3,4-epoxy-6-methylcyclohexylmethyl) adipate, bis (2,3-epoxycyclopentyl) ether, dipentene dioxide, 2-(3,4-epoxycyclohexyl-5,5-spiro-3,4-epoxy) cyclohexanemetadioxane and bis(3,4-epoxycyclohexylmethyl) adipate.

35. The coated substrate of claim 2 wherein the epoxy functional compound has an average of at least two epoxy groups per molecule.

36. The coated substrate of claim 3 further characterized in that the epoxy-functional compound is a mono epoxide.

37. The coated substrate of claim 3 further characterized in that the epoxy-functional compound has an average of at least two epoxy groups per molecule.

38. The coated substrate of claim 3 further characterized in that the anhydride-functional compound is an anhydride-functional polymer having a number average molecular weight of at least about 500.

39. The coated substrate of claim 3 further characterized in that the anhydride-functional compound is an anhydride-functional polymer which is the addition polymerization reaction product of at least one ethylenically unsaturated anhydride and at least one other ethylenically unsaturated monomer.

40. The coated substrate of claim 39 wherein the anhydride-functional addition polymer is further characterized in that the ethylenically unsaturated anhydride is maleic anhydride.

41. The coated substrate of claim 39 wherein the anhydride-functional polymer is the addition polymerization reaction product of (a) 5 to about 40 weight percent of an ethylenically unsaturated monoanhydride and (b) 60 to 95 weight percent of at least one other ethylenically unsaturated monomer copolymerizable with the ethylenically unsaturated anhydride.

42. The coated substrate of claim 4 further characterized in that the hydroxy functional compound (iv) is a hydroxy-functional polymer having a number average molecular weight of at least 400.

43. The coated substrate of claim 42 further characterized in that the hydroxy-functional polymer is selected from the group consisting of hydroxy-functional polyethers, poly esters, acrylic polymers, polyurethanes and polycaprolactones.

44. The coated substrate of claim 42 wherein the hydroxy-functional polymer is further characterized as the addition polymerization reaction product of (a) 10 to about 60 weight percent of a hydroxy-functional ethylenically unsaturated monomer and (b) 40 to about 90 weight percent of at least one ethylenically unsaturated monomer copolymerizable with the hydroxy-functional monomer.

* * * * *